United States Patent [19]

Nordebo

[11] 4,038,575
[45] July 26, 1977

[54] MULTI-PHASE GENERATOR

[76] Inventor: Knut Assar Nordebo, 28 Ringvagen, Haparanda, Sweden, S-953 00

[21] Appl. No.: 452,448

[22] Filed: Mar. 18, 1974

[30] Foreign Application Priority Data

Mar. 19, 1973 Sweden .................. 7303768

[51] Int. Cl.² ............................................. H02K 3/00
[52] U.S. Cl. .................................................. 310/179
[58] Field of Search ............... 310/179, 166, 180, 167, 310/181, 168, 184, 185, 191, 201–208, 169, 170, 171, 187; 322/95; 318/138

[56] References Cited

U.S. PATENT DOCUMENTS

| | | |
|---|---|---|
| 2,802,123 | 8/1957 | Tweedy ................................ 310/187 |
| 2,816,240 | 10/1957 | Zimmerman ......................... 310/168 |
| 2,827,582 | 3/1958 | Krebs ................................... 310/187 |
| 3,041,486 | 6/1962 | Moffitt ................................. 310/168 |
| 3,157,810 | 11/1964 | Adkins ................................. 310/168 |
| 3,408,556 | 10/1968 | Gabor ..................................... 322/95 |
| 3,422,292 | 1/1969 | McCoy ................................. 310/180 |
| 3,452,229 | 6/1969 | Pimlott ................................ 310/168 |
| 3,518,473 | 6/1970 | Nordebo .............................. 310/180 |
| 3,767,950 | 10/1973 | Ainvarg ............................... 310/168 |

Primary Examiner—R. Skudy
Attorney, Agent, or Firm—Pierce, Scheffler & Parker

[57] ABSTRACT

A multi-phase generator without slip rings and brushes and with no windings in the rotor has its exciting winding and alternating current winding, with a mutual displacement of half a stator pole pitch, disposed in the stator. The generator has an even number of stator poles and a different number of rotor poles.

1 Claim, 13 Drawing Figures

FIG. 2
PRIOR ART
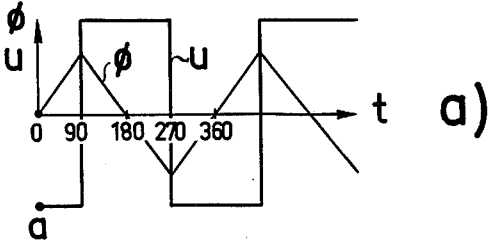
a)
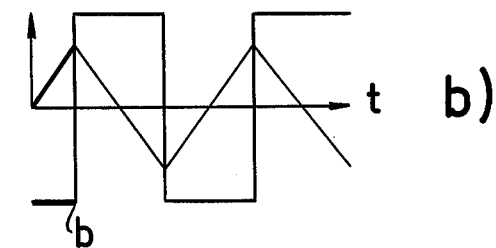
b)
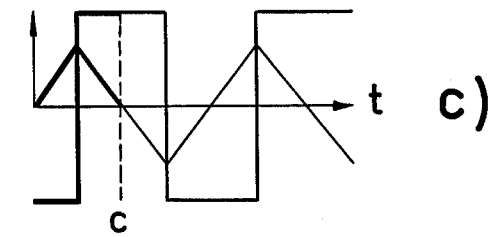
c)
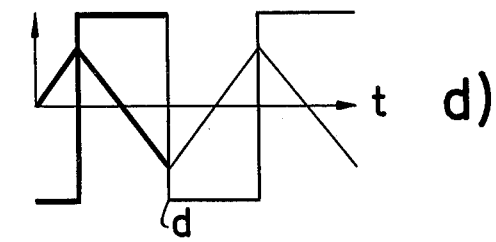
d)
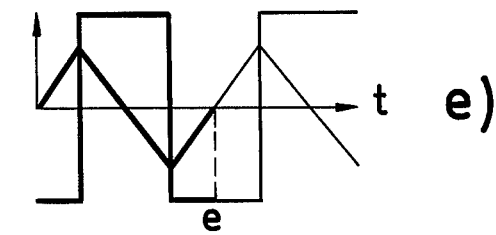
e)
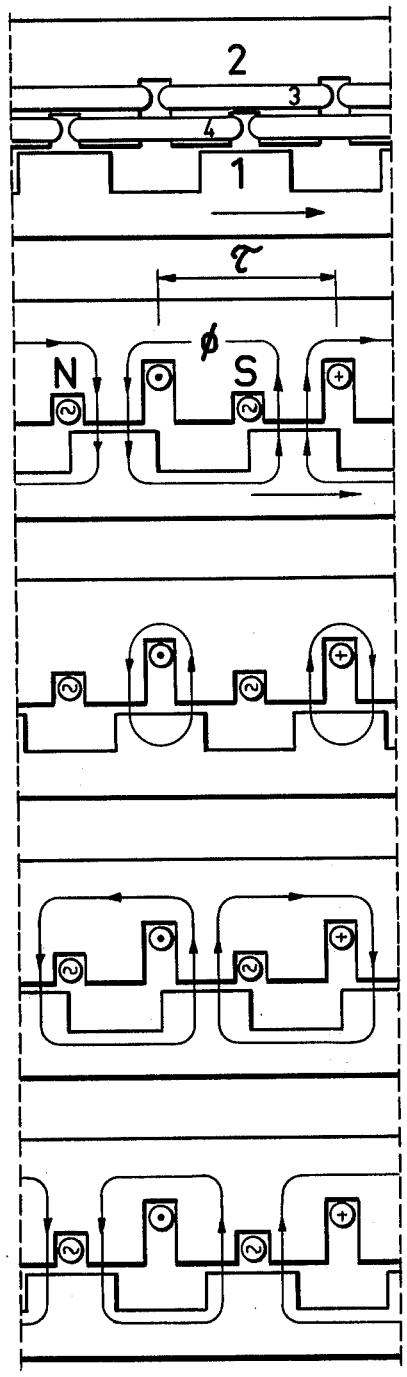

MULTI-PHASE GENERATOR

This invention relates to a multi-phase generator without slip rings and brushes. The invention relates to a design known from single phase generators, where the rotor has no windings and like the stator poles is made of laminated dynamo sheet metal, and where the exciting winding and the alternating current winding are both disposed in the stator and are mutually displaced half a stator pole pitch.

For generating low frequency alternating current, almost exclusively generators having the alternating current winding disposed in the stator and the exciting winding disposed in the rotor have been used for a long time, the excitation current being supplied through brushes and slip rings. Different embodiments of alternating current generators without brushes have also been known for a long time. In spite of their indisputable advantages is has not been economical to produce them due to their great weight per power unit. In different applications the great need of space has also been of decisive importance.

BRIEF DESCRIPTION OF THE DRAWINGS

FIGS. 2 (a), (b), (c), (d), and (e) are schematic diagrams illustrating the principle of operation of the prior art generator structure illustrated in FIG. 1c;

With reference to the accompanying FIG. 1 the prior art will be described more in detail. In FIG. 1 with its FIGS. 1a and 1b two different known generators from the beginning of this century, and in its FIG. 1c a generator according to the Swedish Pat. No. 227,412 (British patent specification No. 1,226,427 and U.S. Pat. No. 3,518,473) are shown. The machines, all three being of single-phase design, are assumed to have equal rotor diameter, rotor pole number, number of revolutions and consequently the same frequency. The change of flux actuating the A.C. winding at a change of position of a rotor pole having a pole width d is then a measure of the change of energy per time unit. This comparison shows that the generator according to FIG. 1c gives the double power output in relation to the two other generators (FIGS. 1a, 1b). As the pole number of the exciting winding in the generator according to FIG. 1c is equal to that of the A.C. winding, radial dimensions of the stator and rotor can be made considerably smaller than in the two other machine types known, resulting in an essential reduction of weight for the former one. The single-phase generator according to FIG. 1c will then give a power output per weight unit being of the same magnitude as for a single-phase slip-ringed generator.

Figure 1:
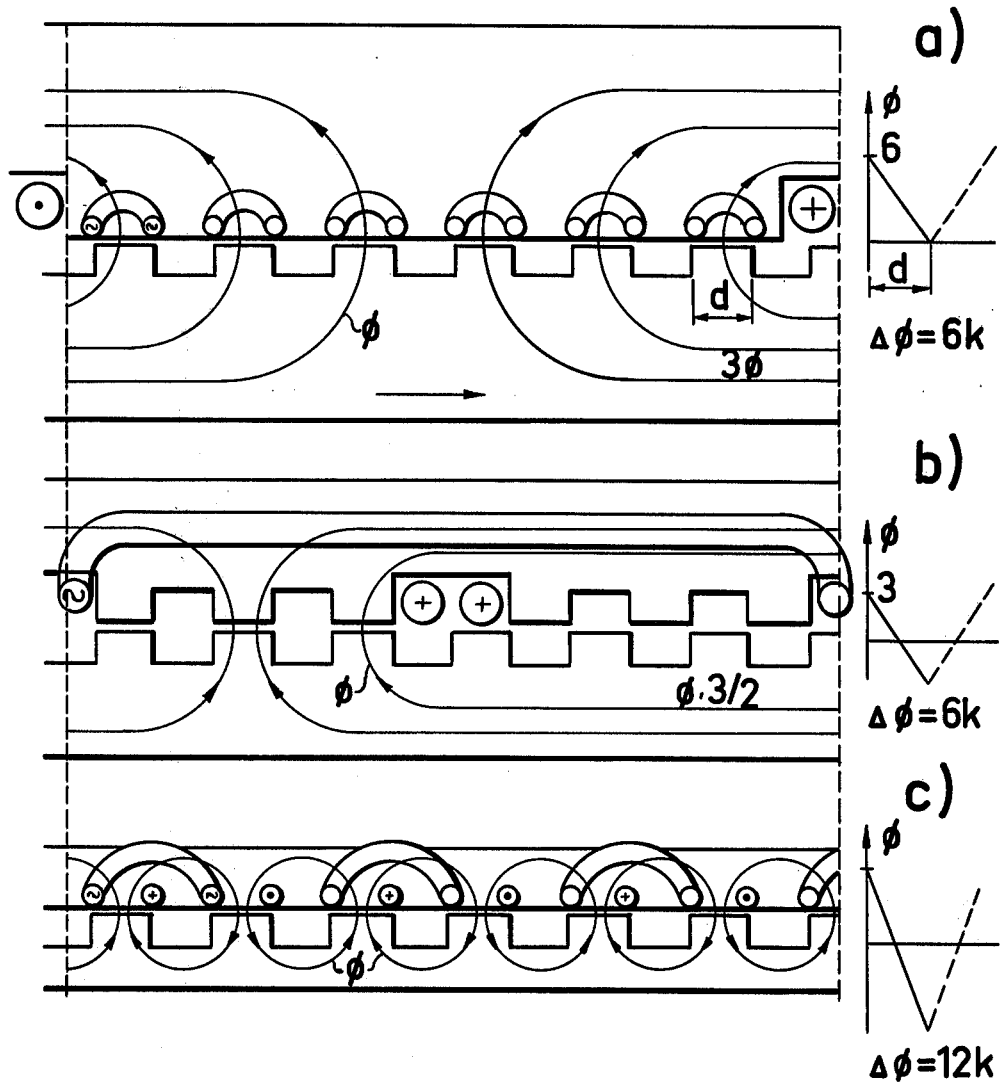
FIGS. 1 (a), (b), and (c) are schematic diagrams of different single-phase generator constructions already known in the art and of the type wherein the rotor has no windings and hence no slip rings and brushes are required.

In order to explain the invention, a more specific description of the principle of the known generator according to FIG. 1c first should be given. Reference is made to FIG. 2, which in its five part Figures shows flux curves $\Phi$ and voltage curves u for four equally great changes of position of the rotor, i.e. a-b, b-c, c-d and d-e, each comprising 90° (electrical), relative to the stator. No regard is paid to the influence of the axial opening of the stator slots. The width of the rotor pole comprises approximately half a pole pitch. The rotor is designated 1, the stator 2, the exciting winding 3 and the A.C. winding 4, these windings being mutually displaced half a stator pole pitch. The stator pole pitch is designated $\tau$.

For the comprehension of the following description it is essential to note that one period is obtained between the passages of each rotor pole with respect to an arbitrary winding and, furthermore, that the positions a and c or c and e, each comprising a change of position of half a pole pitch, give voltage pulses having equal absolute value and being 180° (electrical) displaced in phase.

Relative to a single-phase slip-ringed generator a three-phase one has a higher power output per weight unit and also provides a higher mean time value of the full-wave rectified current when used e.g. as a charging generator for motor vehicles. A single-phase generator without slip-rings and brushes according to FIG. 1c cannot quite simply be changed into a three-phase one in the same way as for a slip-ringed one by introducing two windings mutually displaced by two thirds of a pole pitch relative to the pole number of the stator, and the windings must be interconnected in a special way.

SUMMARY OF THE INVENTION

The problem of achieving a three-phase generator is solved in the following way in accordance with the invention: A multiphase generator has an even number of equally spaced stator poles m.p. and different number of equally spaced rotor poles $m(p \pm 1)$, where $m$ is a factor 1, 2, 3... and where p is an even number 2, 4, 6..., whereby alternating current windings, being displaced in phase 180° (electrical), simultaneously obtain voltage maximum and are connectable to form one phase, and the machine has a phase number $q = p/2$, implying, for instance, for a 6-pole generator the phase number 3 and the rotor pole number 7.

DETAILED DESCRIPTION OF PREFERRED EMBODIMENTS OF THE INVENTION

Figure 3:
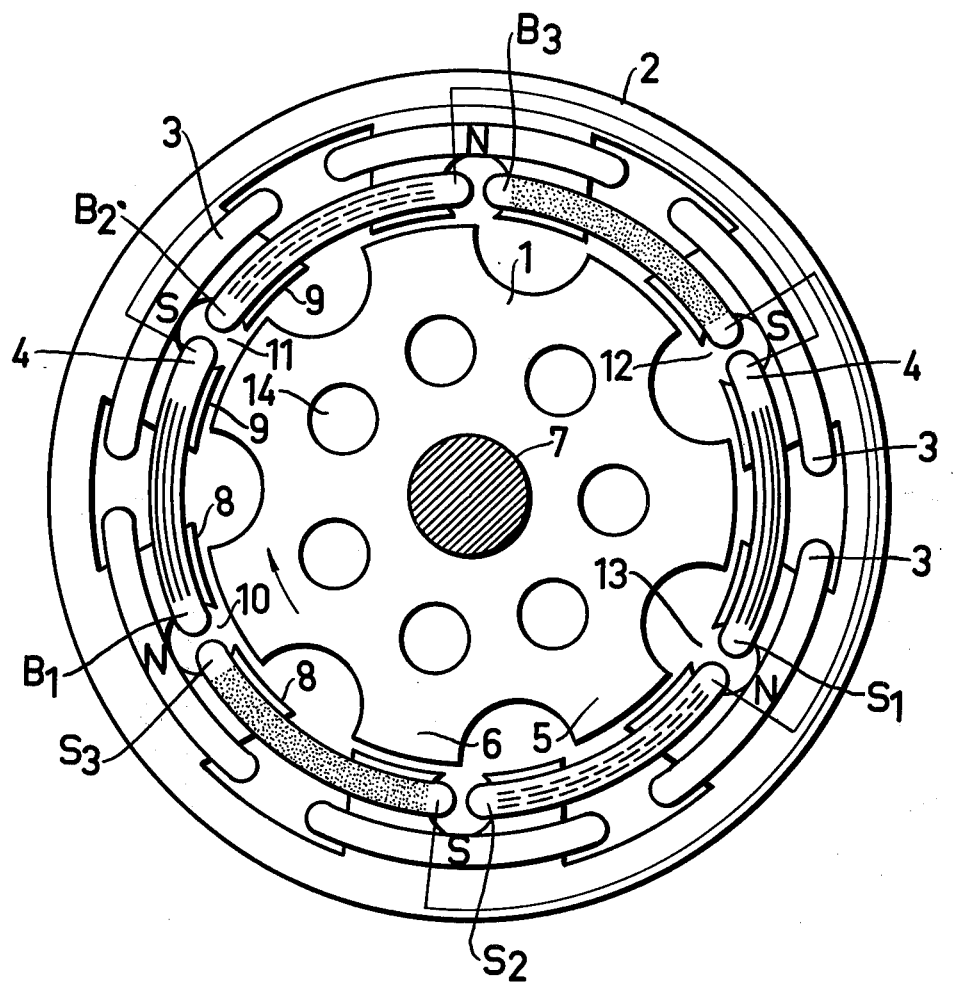
FIG. 3 is a cross-sectional view of a three-phase generator construction in accordance with the present invention.

The invention will now be explained in detail in conjunction with the various embodiments illustrated respectively in FIGS. 3, 5, and 7.

Figure 4:
FIG. 4 illustrates the three phase voltages produced by the generator construction of FIG. 3 as a function of time.

In FIG. 3 the rotor is again designated 1 and has seven poles, two of which are designated 5 and 6. The rotor is attached to a shaft 7. Recesses 14 are made in the rotor to reduce its weight. The stator 2 has six poles, two of which are designated 8 and 9, each one being provided with a centrally disposed winding slot 10, 11. On each stator pole there is an exciting winding 3, alternately providing north and south poles. Diametrically opposed halves of each phase of a three-phase A.C. winding are designated 4. These windings are positioned in the slots 10-13 in the stator poles. The beginning of each phase winding is designated $B_1$, $B_2$, $B_3$ and the end of it $S_1$, $S_2$, $S_3$. In FIG. 3 the rotor takes the position providing a maximum phase voltage $e_{lmax}$ in the phase winding $B_1$-$S_1$. The exciting winding and the three phase winding are mutually displaced by half a pole pitch. That is to say, the exciting winding 3 encompasses each stator pole and each coil 4 of the three phase winding is wound between centrally disposed slots 10, 11 in adjacent stator poles FIG. 4 shows the three phase voltages obtained as a function of time, and it is apparent that they are mutually displaced 120° (electrical). In general a 4-pole stator with a 5-pole rotor will become a 2-phase generator, a 6-pole stator with a 7-pole rotor a 3-phase generator and generally the phase number $q$ equals $p/2$. The principle of the invention will, however, also apply if a number of rotor poles $m(p-1)$ is used together with m.p stator poles. Thus if the 7-pole rotor of the 3-phase generator according to FIG. 3 is replaced by a 5-pole rotor (the rotor pole number $p - 1$ for $p = 6$) a 3-phase generator will still be obtained, but the active total flux will be smaller and the path of the flux in the rotor will be longer. These two disadvantages, however, will diminish for a higher pole number, e.g. for $p = 12$ and the rotor pole number $p - 1 = 11$. For generators with the rotor pole number $p - 1$ the phase number $q$ will still equal $p/2$ and the machine frequency $f = (p-1).n/60$ Hz.

Figure 5:
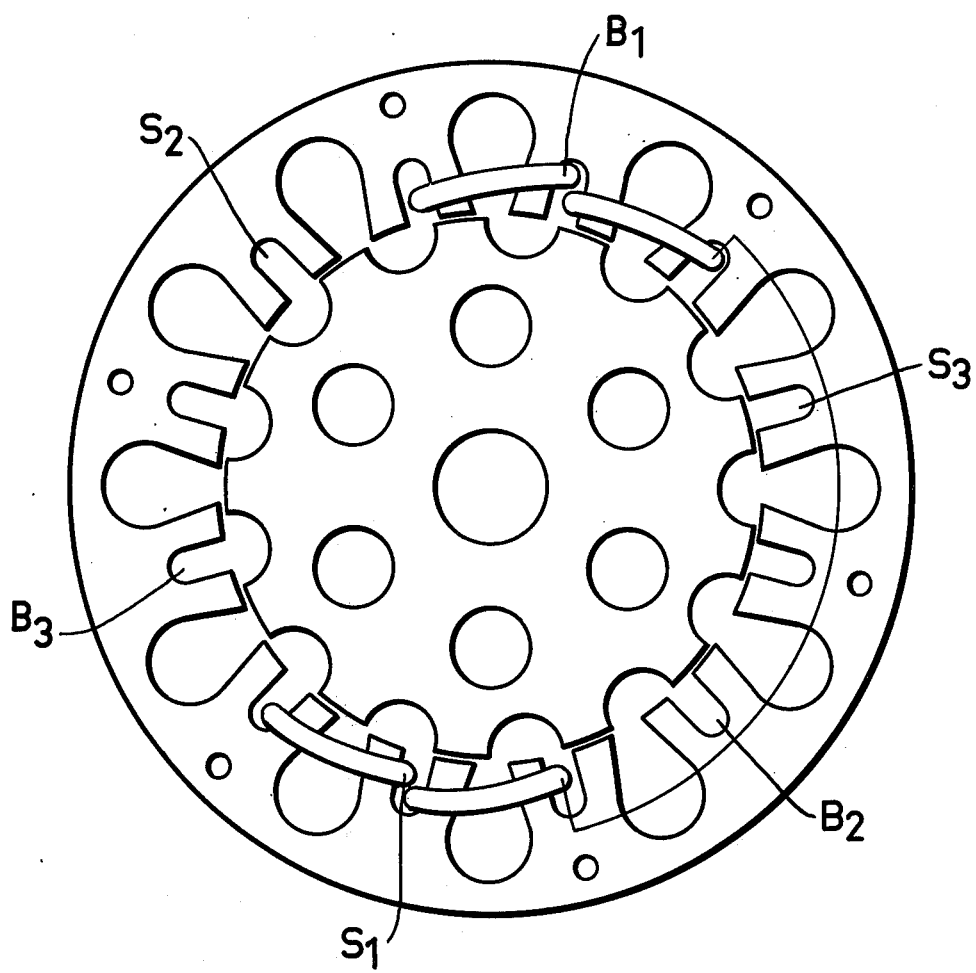
FIG. 5 is a cross-sectional view similar to FIG. 3 showing another embodiment of a three-phase generator construction in accordance with the invention.

In FIG. 5 a 12-pole stator with a 13-pole rotor is diagrammatically shown, a 6-phase generator thus being obtained. However, this can in a simple way be connected to become a three-phase one, if for each phase two adjacent A.C. windings (positioned at a distance of one pole pitch) are connected in series with two diametrically opposite windings connected in series. The diagrammatic FIG. 5 can be thought to illustrate the sheet cuttings of a generator, one of the three phase windings being presented and all the beginnings $B_1$, $B_2$, $B_3$ and ends $S_1$, $S_2$, $S_3$ of the three phase windings being indicated.

The generator can also be constructed with a whole number multiple m of the stator pole number p and of the rotor pole number $p + 1$ ($p - 1$, respectively). For instance, $p$ can be 6 and $m$ can be 2, giving the stator pole number 12 and the rotor pole number 14. Each half of the circumference of the stator is then occupied by each one of two equal 6-pole 3-phase windings, the phase windings of which can be connected in series to give twice the voltage or can be connected in parallel to give twice the current. Such a multiple generator will have half the number of revolutions for a certain frequency, in comparison with the 6-pole one according to FIG. 3.

The generation of a multi-phase voltage, e.g. a 3-phase voltage of the 6-pole machine with a 7-pole rotor, FIG. 3, having three phase terminals $B_1$, $B_2$, $B_3$, resulting in a star-connected one if the winding ends $S_1$, $S_2$ and $S_3$ are joined in a neutral point, can be described in the following way: For each rotor pole passing an arbitrary A.C. winding a period is obtained corresponding to 360° (electrical). One pole more in the rotor than in the stator means 6 rotor pole displacements relative to the 6-pole stator. The induced voltage will then for each stator pole pitch be displaced 360/6 = 60° (electrical) in magnitude or absolute value, which due to alternating polarity of each stator pole winding means 180° − 60° = 120° (electrical) phase displacement between two adjacent terminals, e.g. $B_1$ and $B_2$.

The resulting voltage appearing in a phase winding can be explained in the following way: In the two series-connected coils of one phase, e.g. $B_1$-$S_1$, a voltage maximum will occur simultaneously, but when two rotor poles pass the sides of an arbitrary coil, the voltage in the opposite series-connected coil will occur 30° (electrical) after the one coil side and 30° (electrical) before the other coil side, which means that the voltages of the coil sides displaced 60° (electrical) will have a resultant being in phase with the voltage of the opposite coil.

The phase voltage, thus consisting of three part voltages displaced 30° (electrical), will then, as distinguished from the square curve according to FIG. 2, have a form approaching the sinusoidal one, providing in practice, as has turned out, for a star-connection of the phases a nearly sinusoidal voltage between the phases.

Figure 6:
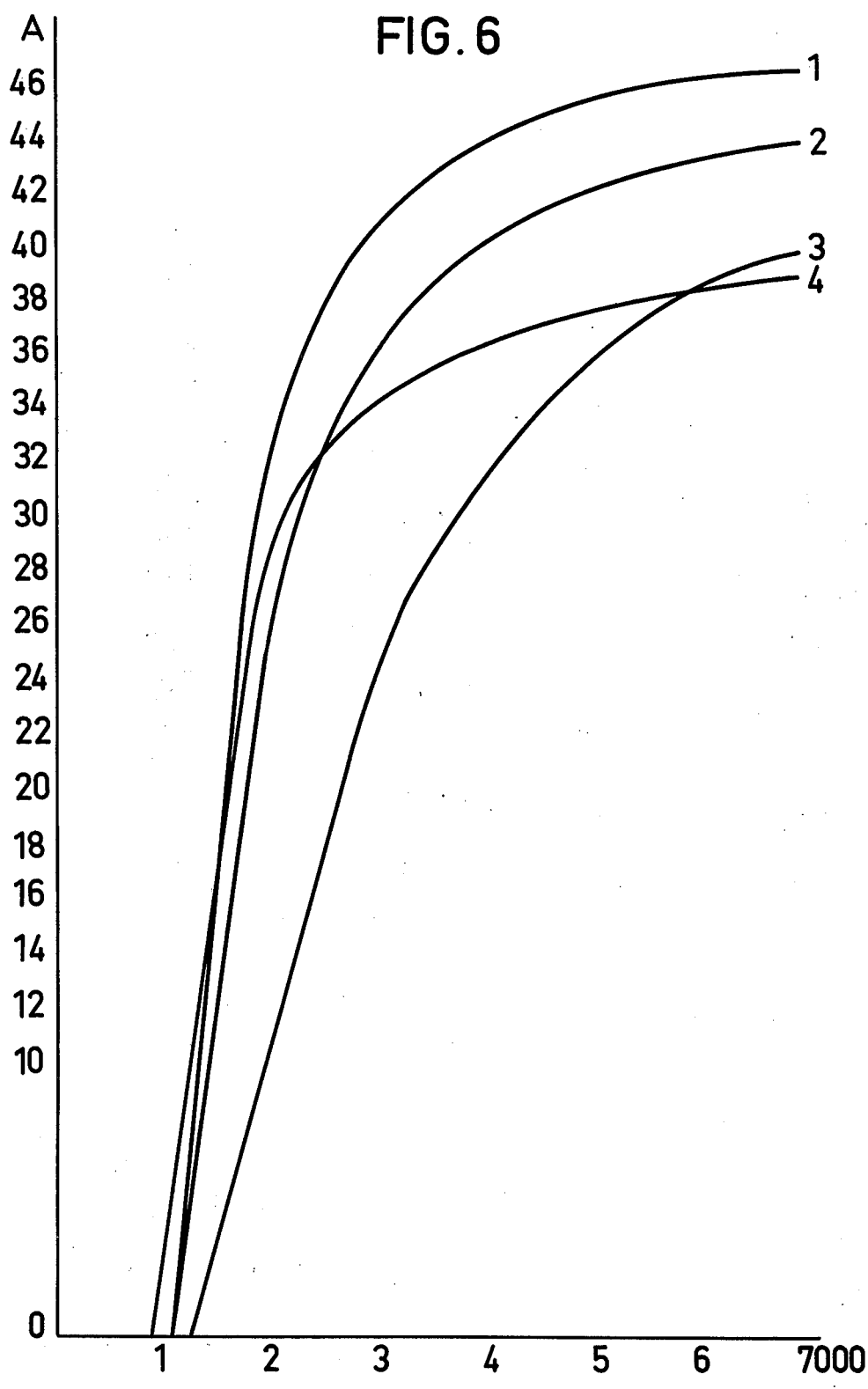
FIG. 6 is a family of curves illustrating comparative charging characteristics for the generator constructions of the prior art and the present invention.

In FIG. 6 charging characteristics for a 3-phase generator in accordance with the invention and for three other, known generators are shown. The ordinate relates to current intensity A in amperes and the abscissa to revolutions per min. The curve 1 refers to the 3-phase generator according to the invention, the total weight of the generator being 5.7 kg. It was found that this generator reaches a high current intensity already for a low number of revolutions, being flattened to a high saturation value. The curve 2 indicates the performance of a marketed three-phase brush-less generator having a weight of 8.2 kg. The curve 3 refers to a single-phase brush-less generator according to FIG. 1c having a total weight of 5.7 kg. Finally, curve 4 relates to a marketed slip-ringed three-phase generator having a total weight of 4.0 kg. All the generators have the rated voltage 12 V.

From these curves it is apparent that the generator according to the invention shows a substantially better performance than all the generators previously known.

Figure 7:
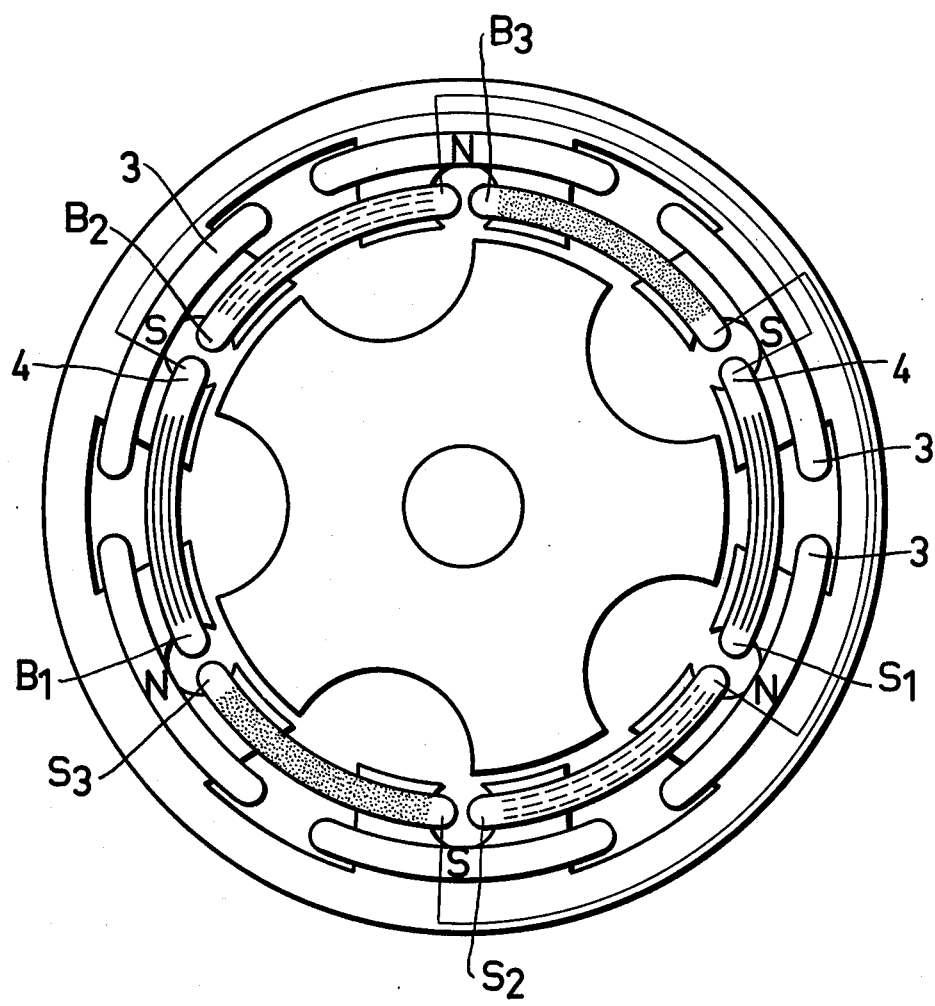
FIG. 7 is a cross-sectional view of still another embodiment of a three-phase generator construction in accordance with the present invention.

FIG. 7 shows a generator with $p = 6$ and the rotor pole number $p - 1 = 5$. This generator may be regarded as a modification of the generator according to FIG. 3 and its constructive description is substantially applicable also to the generator according to FIG. 7. The disadvantages of the latter generator have been discussed above, and for a relatively low value of $p$ it is thus more advantageous to provide the rotor with the rotor pole number $p + 1$, but for high values of p acceptable results can also be obtained with the rotor pole number $p - 1$.

I claim:

1. A multi-phase induction generator including in combination, a rotor having a plurality of equally spaced poles but no windings thereon, a stator having a different number of equally spaced poles each provided with a single centrally disposed slot, said rotor and stator being mounted concentrically for relative rotation and with an air gap therebetween, a direct current energizable exciting winding mounted on said stator and encompassing each said stator pole for producing magnetic flux of the opposite sense in adjacent stator poles, and a multi-phase alternating current output winding mounted on said stator with the phase windings located respectively in the centrally disposed slots of adjacent stator poles thereby to achieve a mutual displacement of half a pole pitch between said exciting winding and said multi-phase output winding, said multi-phase output winding producing a multi-phase output voltage between beginning and end terminals of each stator phase winding, the number of stator poles being equal to $m \cdot p$, the number of rotor poles being equal to $m(p \pm 1)$, m being an integer factor 1, 2, 3...., and p being an even integer 2, 4, 6 ... .

* * * * *